US010090084B1

(12) United States Patent
Cronkrite

(10) Patent No.: US 10,090,084 B1
(45) Date of Patent: Oct. 2, 2018

(54) MODULAR BUS BAR INSULATOR

(71) Applicant: Travis J. Cronkrite, Glenville, NC (US)

(72) Inventor: Travis J. Cronkrite, Glenville, NC (US)

(*) Notice: Subject to any disclaimer, the term of this patent is extended or adjusted under 35 U.S.C. 154(b) by 0 days.

(21) Appl. No.: 15/894,641

(22) Filed: Feb. 12, 2018

(51) Int. Cl.
H01B 17/56 (2006.01)
H02B 1/04 (2006.01)
H02B 1/20 (2006.01)
H02B 1/48 (2006.01)

(52) U.S. Cl.
CPC ............ H01B 17/56 (2013.01); H02B 1/04 (2013.01); H02B 1/20 (2013.01); H02B 1/48 (2013.01)

(58) Field of Classification Search
CPC . H01B 17/56; H02B 1/04; H02B 1/20; H02B 1/48
USPC .......................................... 361/624; 174/68.3
See application file for complete search history.

(56) References Cited

U.S. PATENT DOCUMENTS

| 2,321,066 | A | 6/1943 | Dense et al. |
|---|---|---|---|
| 2,439,859 | A | 4/1948 | Muller |
| 2,778,562 | A | 1/1957 | Tilly |
| 3,113,820 | A | 12/1963 | Norden |
| 3,139,231 | A | 6/1964 | Hueschen |
| 3,308,348 | A | 3/1967 | Olashaw et al. |
| 3,514,671 | A | 5/1970 | Eck et al. |
| 3,616,990 | A | 11/1971 | Powell |
| 3,778,682 | A | 12/1973 | Bright |
| 3,873,018 | A | 3/1975 | Donnay |
| 3,924,161 | A | 12/1975 | Olashaw et al. |
| 4,031,433 | A | 6/1977 | Olashaw |
| 4,180,845 | A * | 12/1979 | Shariff ............... H02B 1/21 174/133 B |
| 4,472,761 | A | 9/1984 | Koslosky et al. |
| 4,735,337 | A | 4/1988 | Von Holdt |
| 4,795,035 | A | 1/1989 | Kim |
| 5,250,127 | A | 10/1993 | Hara |
| 5,327,321 | A | 7/1994 | Rosen |
| 5,400,957 | A | 3/1995 | Stude |
| 6,552,273 | B2 | 4/2003 | Nishida |
| 2014/0311768 | A1 * | 10/2014 | Takishita ............. H01R 13/447 174/66 |
| 2015/0017516 | A1 * | 1/2015 | Ogasawara ............. H01M 2/34 429/160 |
| 2015/0188302 | A1 | 7/2015 | Kim et al. |

FOREIGN PATENT DOCUMENTS

| EP | 0150685 | 7/1985 |
|---|---|---|
| GB | 1135133 | 11/1968 |
| WO | WO03/105301 | 12/2003 |

OTHER PUBLICATIONS

"Bus Boots for the Switchgear Industry," Meister International, LLC, 2012, 57 pages.

* cited by examiner

Primary Examiner — Timothy Thompson
Assistant Examiner — Charles Pizzuto
(74) Attorney, Agent, or Firm — Fish & Richardson P.C.

(57) ABSTRACT

An insulator for a bus bar of a breaker panel may be modularly sacrificed for the installation of a breaker. The ability to modularly sacrifice insulating portions enables protection of the electrical service worker while installing a new breaker panel or modifying an existing breaker panel.

17 Claims, 8 Drawing Sheets

MODULAR BUS BAR INSULATOR

BACKGROUND

A typical breaker panel, such as a breaker panel in a residential building or commercial building, includes a bus bar structure that has at least one, and typically two elongated bus bars that are respectively connected to different phases in an electrical system. The bus bars are usually interspersed in an opposing comb-like structure, as depicted in FIGS. 1 and 2. The bus bars are arranged within the breaker panel such that as breakers are cumulatively added to the breaker panel, the load of the system is distributed among the phases.

The bus bars on the breaker panel are often exposed at various times. For example, when a panel is first installed, conductive portions of the bus bar that electrically couple to breakers may be exposed when the breakers are not installed. This can lead to an electrical hazard. Additionally, during installation, there may be additional construction going on in the area of the breaker panel. Construction debris, such as drywall dust, for example, may deposit on the exposed portions of the bus bar. If the debris is not cleaned before a breaker is connected to the bus bar, conduction between the breaker and the bus bar may be inhibited by the resulting resistance. This can lead to nuisance trips, shorts, and equipment failure. Further still, during painting, paint may be accidentally applied to the bus bars, which drastically inhibits a conductive connection between the bus bar and circuit breaker.

SUMMARY

This specification relates to a modular bus bar insulator that allows for the modular removal of portions of the insulator for attaching corresponding breakers. The modular form of the insulator provides for easy removal of the insulator without the need for specific tools, and also provides for insulation of the bus bar and protection of the bus bar from debris while attached.

In general, one innovative aspect of the subject matter described in this specification can be embodied in an apparatus that includes an insulator apparatus, comprising: a plurality of insulator modules formed of an insulator material, each insulator module: corresponding to a respective portion of a bus bar apparatus in a breaker panel, modularly formed to affix within the breaker panel to cover its respective portion of the bus bar apparatus and to provide insulation protection from the respective portion of the bus bar apparatus when affixed within the breaker panel; and defined by a periphery that corresponds to a periphery of one or more circuit breakers that can attach to the respective portion of the bus bar apparatus; separation regions defining the peripheries of the insulator modules, each separation region having a shear strength less than a shear strength of the portion of the insulator material within the peripheries of the insulator modules such that, when the insulator apparatus is affixed within the breaker panel, each insulator module may be individually separated from the insulator apparatus to expose the respective portion of the bus bar apparatus to which it corresponds so that the respective portion of the bus bar so exposed may receive one or more circuit breakers.

Another innovative aspect of the subject matter described in this specification can be embodied in an apparatus that includes a circuit breaker panel, comprising: a breaker box; and a bus bar apparatus within the main breaker box, the bus bar apparatus including a pair of opposed hot bus bars, each of the hot bus bars including a plurality of respective portions that can electrically couple to a circuit breaker when the circuit breaker is received in the breaker box; and an insulator apparatus, comprising a plurality of insulator modules formed of an insulator material, each insulator module: corresponding to a respective portion of the opposed hot bus bars, modularly formed to affix within the breaker box and to cover its respective portion of the bus bar apparatus and to provide insulation protection from the respective portion of the bus bar apparatus when affixed within the breaker box; and defined by a periphery that corresponds to a periphery of one or more circuit breakers that can attach to the respective portion of the hot bus bars; separations regions defining the peripheries of the insulator modules, each separation region having a shear strength less than a shear strength the portion of the insulator material within the peripheries of the insulator modules such that, when the insulator apparatus affixed within the breaker panel, each insulator module may be individually separated from the insulator apparatus to expose the respective portion of the hot bus bars to which it corresponds so that the respective portion of the hot bus bars so exposed may receive one or more circuit breakers.

Another innovative aspect of the subject matter described in this specification can be embodied in an apparatus that includes an insulator system, comprising: one or more insulator modules formed of an insulator material, each insulator module: corresponding to a respective portion of a bus bar apparatus in a breaker panel, modularly formed to affix within the breaker panel to cover its respective portion of the bus bar apparatus and to provide insulation protection from the respective portion of the bus bar apparatus when affixed within the breaker panel; and defined by a periphery that corresponds to a periphery of one or more circuit breakers that can attach to the respective portion of the bus bar apparatus.

The inventions describe in this written description may realize one or more of the following advantages. In implementations in which the insulation modules are connected to each other by separation regions, each insulation module may be removed quickly and easily without the use of hand tools, or, alternatively, by use of a simple gripping tool, such as pliers. This allows for rapid removal of the insulation on an as-needed basis, and does not significantly impact service time or installation time required by electrician professionals. Because the periphery defined by the separation regions also define a footprint of a breaker, a single module may be removed, and after the corresponding circuit breaker is installed, no portions of the bus bars remain exposed to present electrical hazards. By forming the insulation apparatus to mate with particular breaker panel designs, an inexpensive molding process may be used to manufacture the insulation apparatus. Accordingly, particular molds for corresponding breaker panels may be used to manufacture the insulating apparatus in a variety of different shapes and sizes. Because the insulator apparatus is molded to the outer contours of the breaker panel in the vicinity of the bus bars, the conductive portions of the bus bars are protected from construction debris, dust, paint, and the like. Accordingly, there is no need for additional cleaning of the bus bar underlying an insulation module after the insulation module is removed.

The details of one or more embodiments of the subject matter described in this specification are set forth in the accompanying drawings and the description below. Other

DETAILED DESCRIPTION

Figure 1:
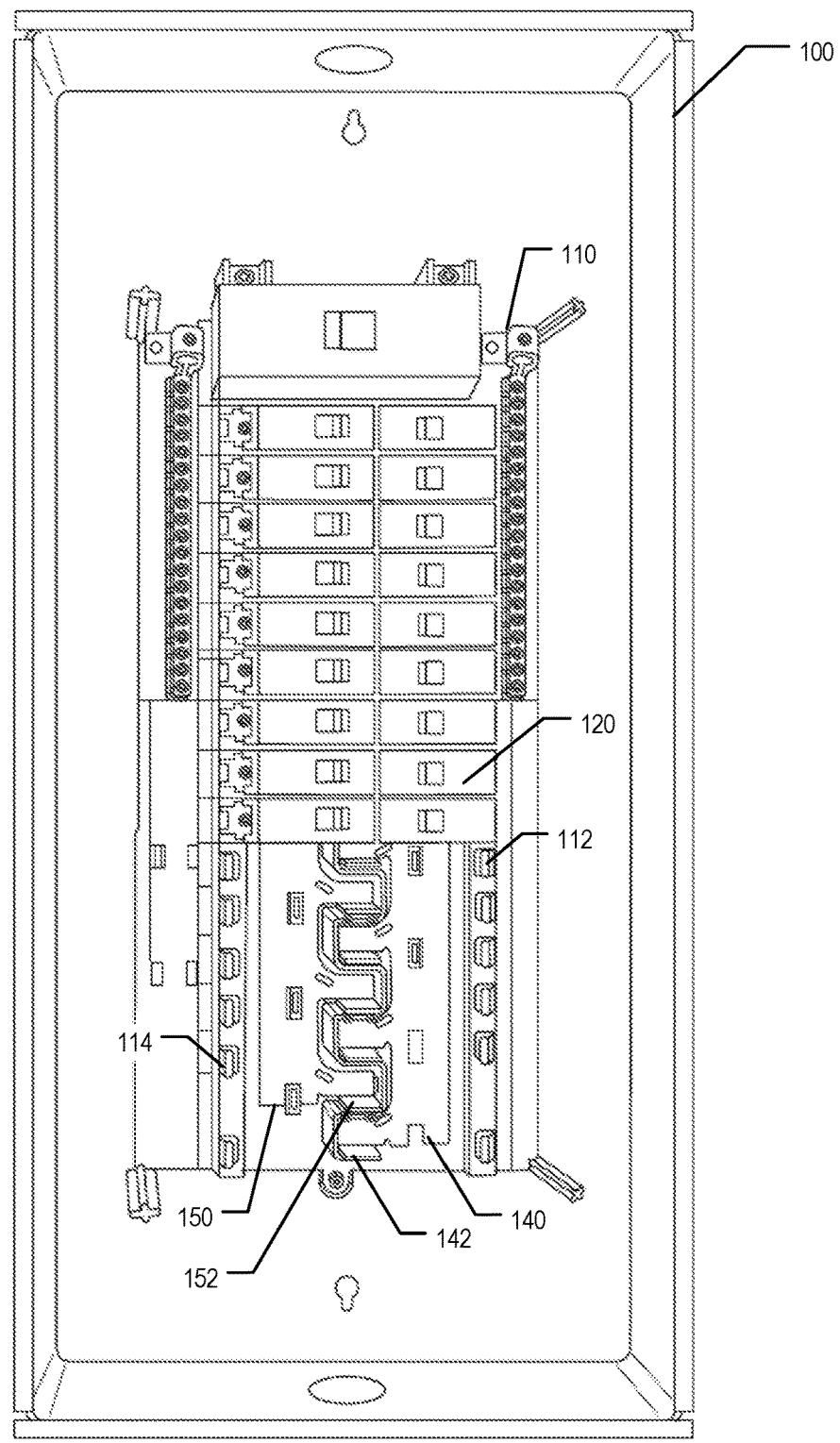
FIG. 1 is a top view of a breaker box with circuit breakers.

FIG. 1 is top view of a breaker box 100 with circuit breakers 120. In FIG. 1, the breaker box 100 includes a panel assembly 110 and panel tabs 112 on the right side and panel tabs 114 on the left side. Within the panel is a bus bar apparatus, which, in this example, includes hot bus bars 140 and 150, which respectively carry different phases of electrical power. In the examples that follow, two-phase breaker boxes are used for illustrative breaker boxes. However, the insulator apparatus may also be implemented in single-phase or three-phase breaker boxes.

Each bus bar 140 and 150 has respective conductive bus tabs 142 and 152, of which only two are numbered to avoid congestion in the drawings. To install a circuit breaker 120, the circuit breaker 120 is engaged with the panel tab 112 or 114 and corresponding bus tabs 142 or 152.

In FIG. 1, the breaker box 100 is illustrated with portions of the bus bars 140 and 150 full exposed. Such a configuration may occur, for example, when an electrician is initially installing the breaker box 100 and installing breakers 120 for corresponding loads. As can be seen from FIG. 1, there is a significant shock hazard present.

Figure 2:
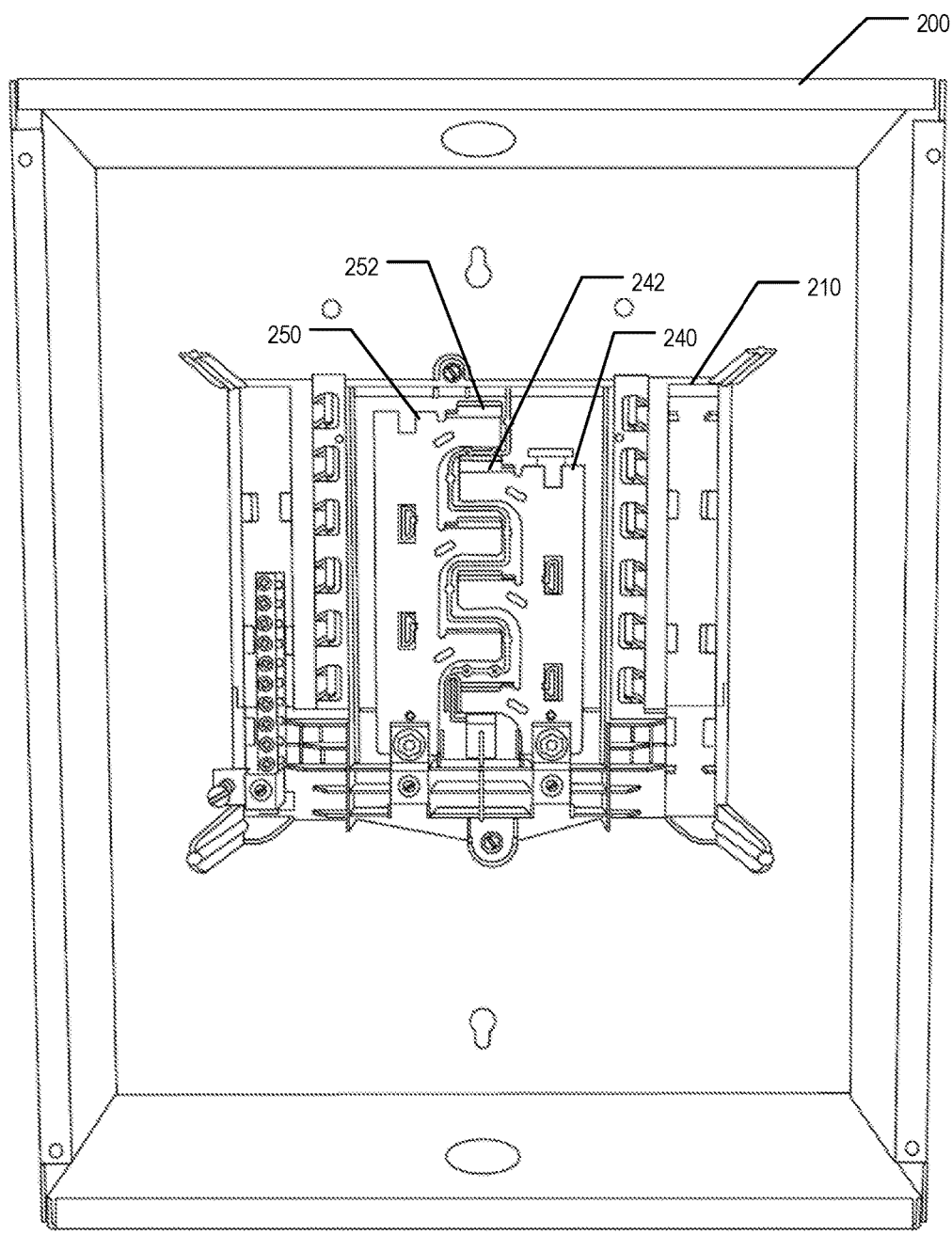
FIG. 2 is a top view of a breaker box without circuit breakers and having fully exposed bus bars.
Figure 3:
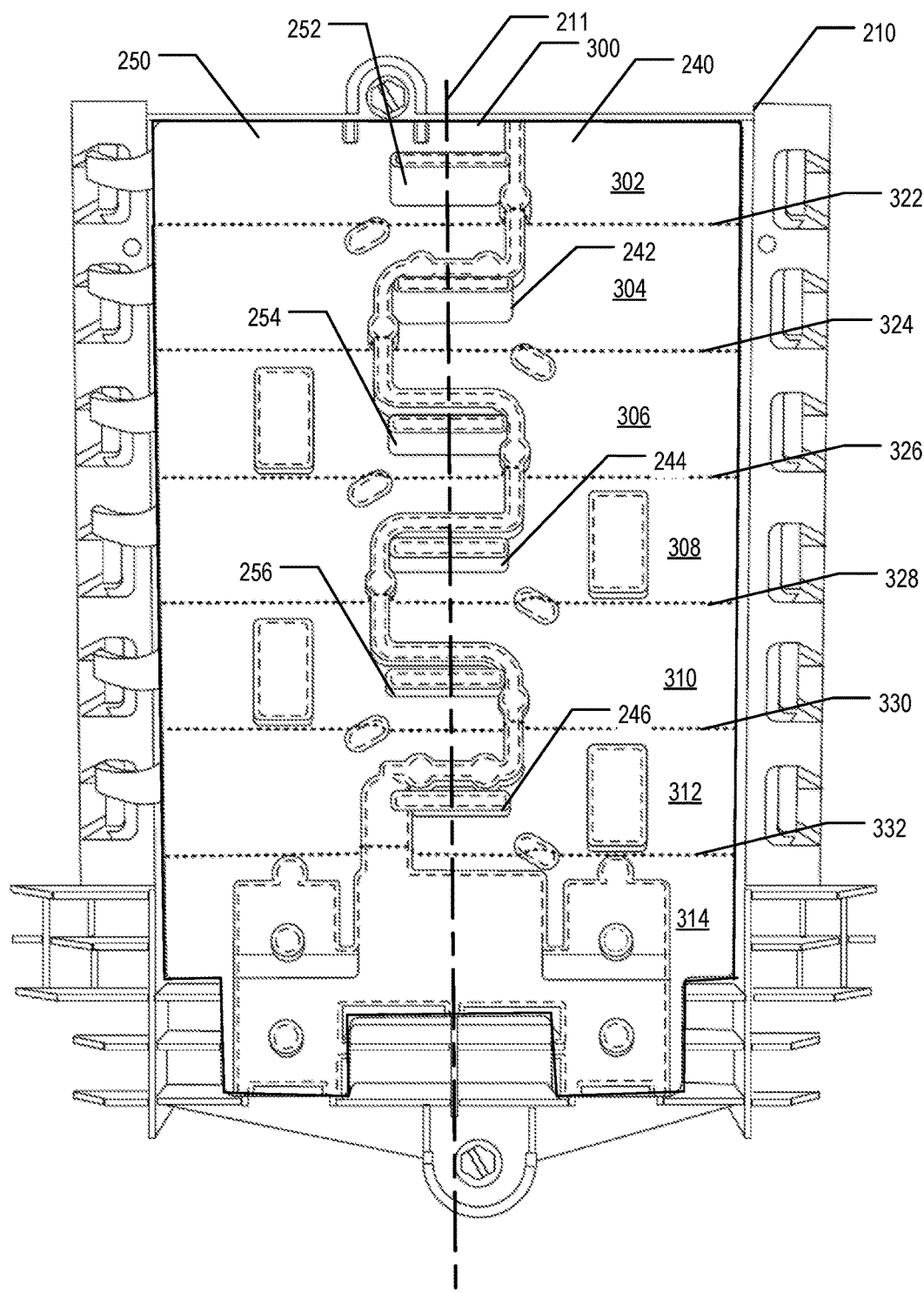
FIG. 3 is a top view of a portion of the breaker panel of FIG. 2 with insulator modules of an insulator apparatus that are insulating respective portions of the bus bars.

FIG. 2 illustrates another breaker box 200 with a smaller breaker panel assembly 210, and further illustrates one example configuration of bus bars 240 and 250. FIG. 3 is a top view of a portion of the breaker panel assembly 210 of FIG. 2 with insulator modules 302-314 of an insulator apparatus 300 that are insulating respective portions of the bus bars 240 and 250, which are the hot bus bars. The insulator apparatus 300 is fitted, e.g., by a molding process, to mate with the various surface contours, tabs, and the like of the bus bars 240 and 250 and surrounding portion of the breaker panel assembly 210.

As shown in FIG. 3, the insulator apparatus 300 includes multiple insulator modules 302, 304, 306, 208 and 310. Each insulator module is formed of an insulator material, such as a flexible elastomer, neoprene rubber, ethylene propylene diene monomer (EPDM) rubber, or silicone rubber. Alternatively, the material may be a more rigid thermoplastic.

Each insulator module 302, 304, 306, 208 and 310 corresponds to a respective portion of the bus bars 240 and 250, and is modularly formed to affix within the breaker panel to cover its respective portion of the bus bars 240 and/or 250. By doing so, each insulator module 302, 304, 306, 308 and 310 provides insulation protection from the respective portions of the bus bars 240 and 250 when affixed within the breaker panel assembly 210.

Each insulator module 302, 304, 306, 208 and 310 is also defined by a periphery that corresponds to a periphery of one or more circuit breakers that can attach to the respective portions of the bus bars.

In the example implementation of FIG. 1, the peripheries are defined by separation regions 322, 324, 326, 328, 330 and 332. The outer periphery of the insulator apparatus 300 is formed such that the bus bars 240 and 250 are not exposed. Each separation region 322, 324, 326, 328, 330 and 332 has a shear strength less than a shear strength of the portion of the insulator material within the peripheries of the insulator modules 302, 304, 306, 308 and 310. The shear strength is measured in a plane the includes the separation region. By pulling an individual insulator module upward from the bus bars, the separation regions defining the periphery of the individual insulator module will separate, enabling the individual insulator module to be removed from the bus bars while the other insulator modules remain. In some implementations, a user may place their fingers on the insulator modules that are to be retained, e.g., modules 302 and 306, and pull upward on the module to be removed, e.g., module 304. Thus, when the insulator apparatus 300 is affixed within the breaker panel assembly 210, each insulator module 302, 304, 306, 308 and 310 may be individually separated from the insulator apparatus 300 to expose the respective portions of the bus bars 240 and 250 to which it corresponds so that the respective portions of the bus bars so exposed may receive one or more circuit breakers 120.

As illustrated in FIG. 3, each insulator module 302, 304, 306, 308 and 310 traverses both bus bars 240 and 250 so that when one insulator module is removed, a portion of both bus bars 240 and 250 is exposed. In an alternate implementation, another separation region may traverse the longitudinal axis 211, and the insulator module so removed may only expose a region of the bus bars from the center of the breaker panel assembly 210 to one side.

The insulator apparatus 300 may also include another module 314 to cover a remaining portion of the bus bars 240 and 205 to which circuit breakers are not attached.

For bus bars that include vertically extending conductive tabs, each insulator module may be modularly formed to affix to the breaker panel by being modularly formed to receive one or more conductive bus tabs of the respective portion of the bus bar apparatus to which it corresponds. When the insulator module so receives the one or more tabs, it provides insulation protection from the one or more conductive bus tabs of the respective portion of the bus bar.

Figure 4:
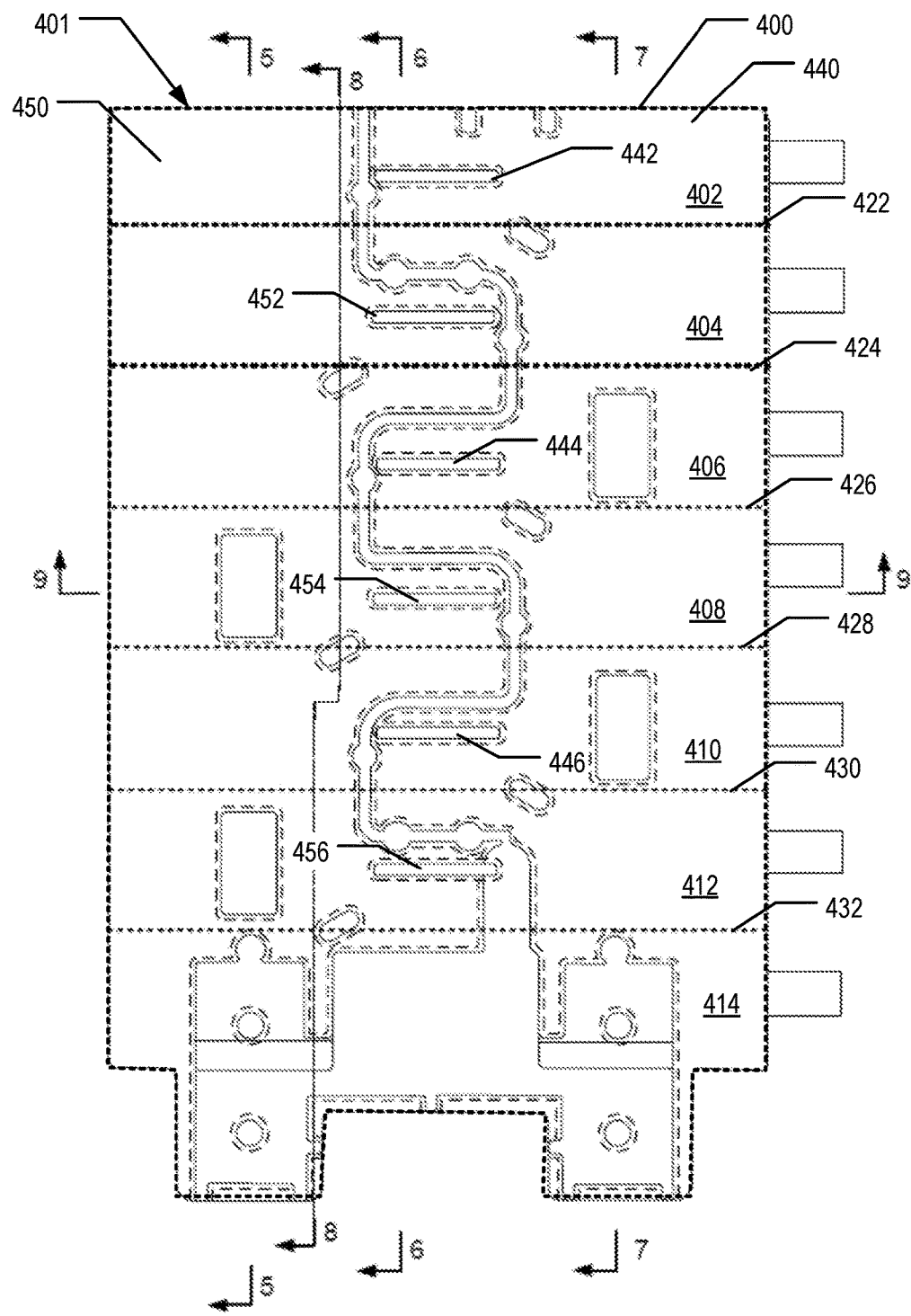
FIG. 4 is a top view of the portion of a breaker panel covered by the insulator apparatus and corresponding sectional view indicators.
Figure 5:
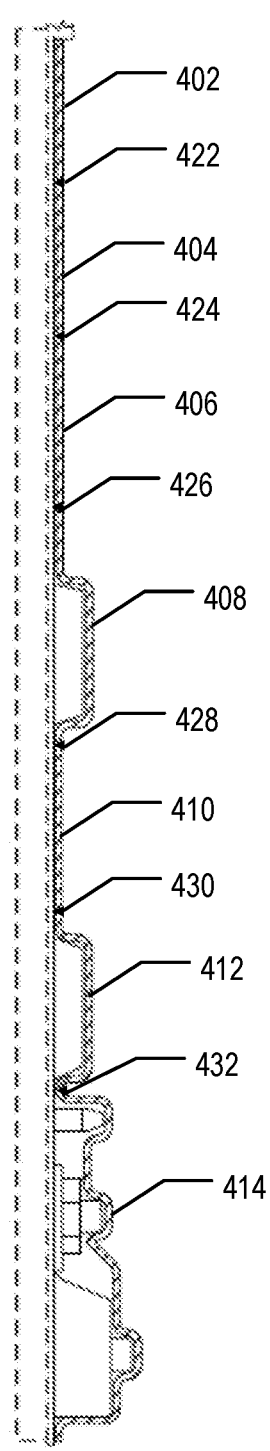
FIGS. 5-9 are sectional views of the portion of the breaker panel covered by the insulator apparatus depicted in FIG. 4.

Such insulation is illustrated in more detail with reference to FIGS. 4-9. FIG. 4 is a top view of a portion of a breaker panel assembly 401 covered by an insulator apparatus 400. The corresponding sectional views are illustrated in FIGS. 5-9. The insulator apparatus 400 of FIG. 4 is similar to that of FIG. 3, and includes insulator modules 402, 404, 406, 408, 410 and 412 that cover corresponding portions of the bus bars 440 and 450. The bus bars include conductive tabs 442, 444, 446, 452, 454 and 456. Separation regions 422, 424, 426, 428, 430 and 432 define the interior peripheries of the insulator modules 402, 404, 406, 408, 410 and 412.

FIGS. 5-8 illustrate the separation regions 422, 424, 426, 428, 430 and 432 at various cross-sections. In some implementations, the separation regions are formed of the insulator material and integrally formed with the plurality of insulator modules. For example, the separation regions may be perforations to enable tearing along the separation region when a portion of the insulator module is pulled. Alternatively, the separation regions may have a thickness that is less than a thickness of the insulator material within the peripheries of the insulator modules, which also reduces the shear strength along the separation region to enable a clean tear. Other types of separation regions in an integrally formed insulator apparatus may include scorings, for example. In other implementations, the insulator modules may be separately formed and connected at the separation regions by a glue or some other adhesive or connection means (e.g., sewn together, plastic staples, or even integrally formed male and female connecting apparatus on each insulator module).

FIGS. 5-8 also illustrate how the insulator modules may be a form molded to receive a corresponding breaker panel. As illustrated at each cross section, the insulator apparatus 400, by means of its respective modules 402, 404, 406, 408, 410 and 412, receives the corresponding breaker panel and are thereby attached to the panel and provide insulation and protection of the bus bars 440 and 450.

Figure 6:
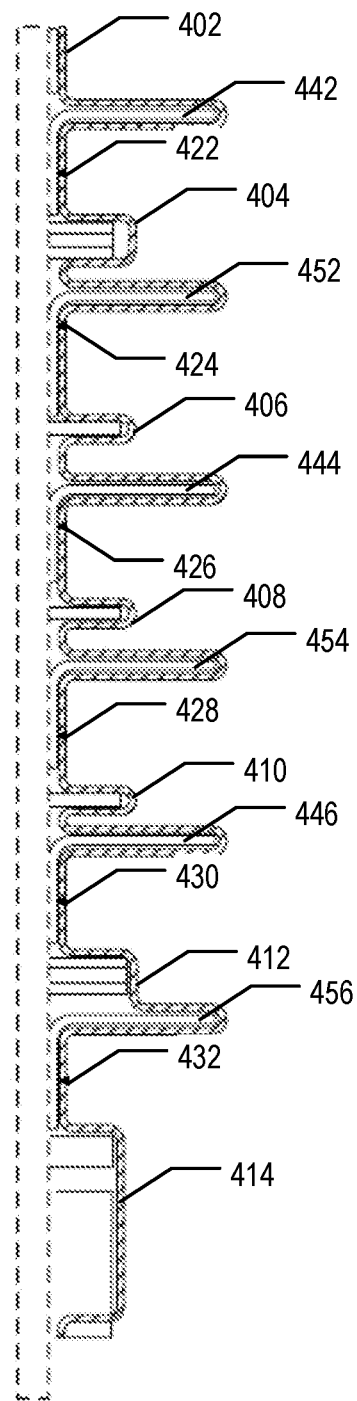
Figure 7:
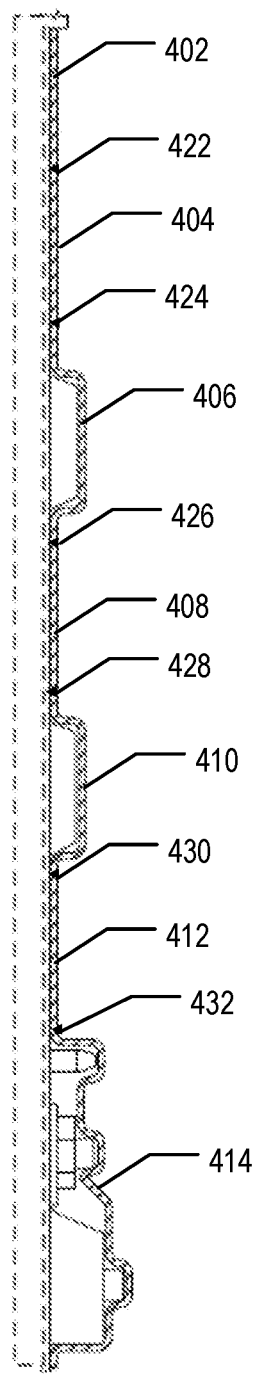
Figure 8:
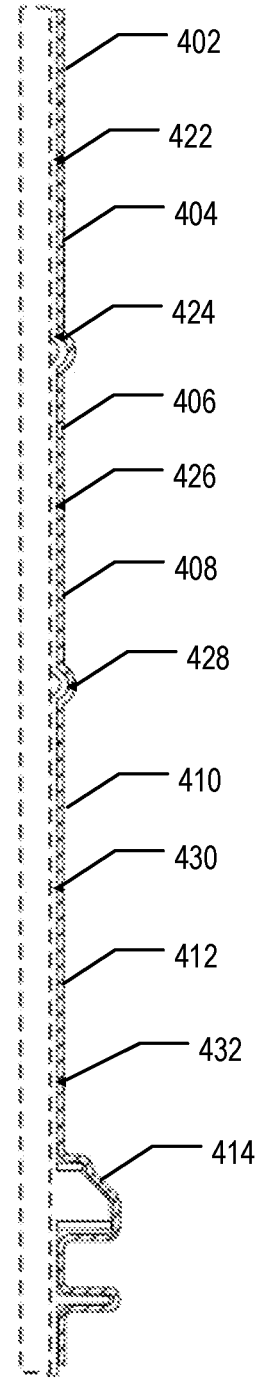
Figure 9:
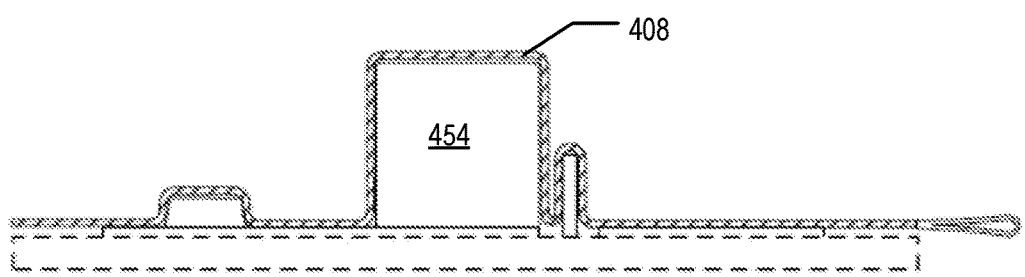

With reference to FIG. 6, an electrician may desire to install one or more circuit breakers on tab 442. To do so, the electrician may simply grip the portion of the insulator module 402 receiving the tab 442 and pull upward, while pressing on the insulator module 404. This will cause the separation region 422 to separate under shear, thereby exposing the bus bars and providing a footprint within which the circuit breakers may be installed.

Figure 10:
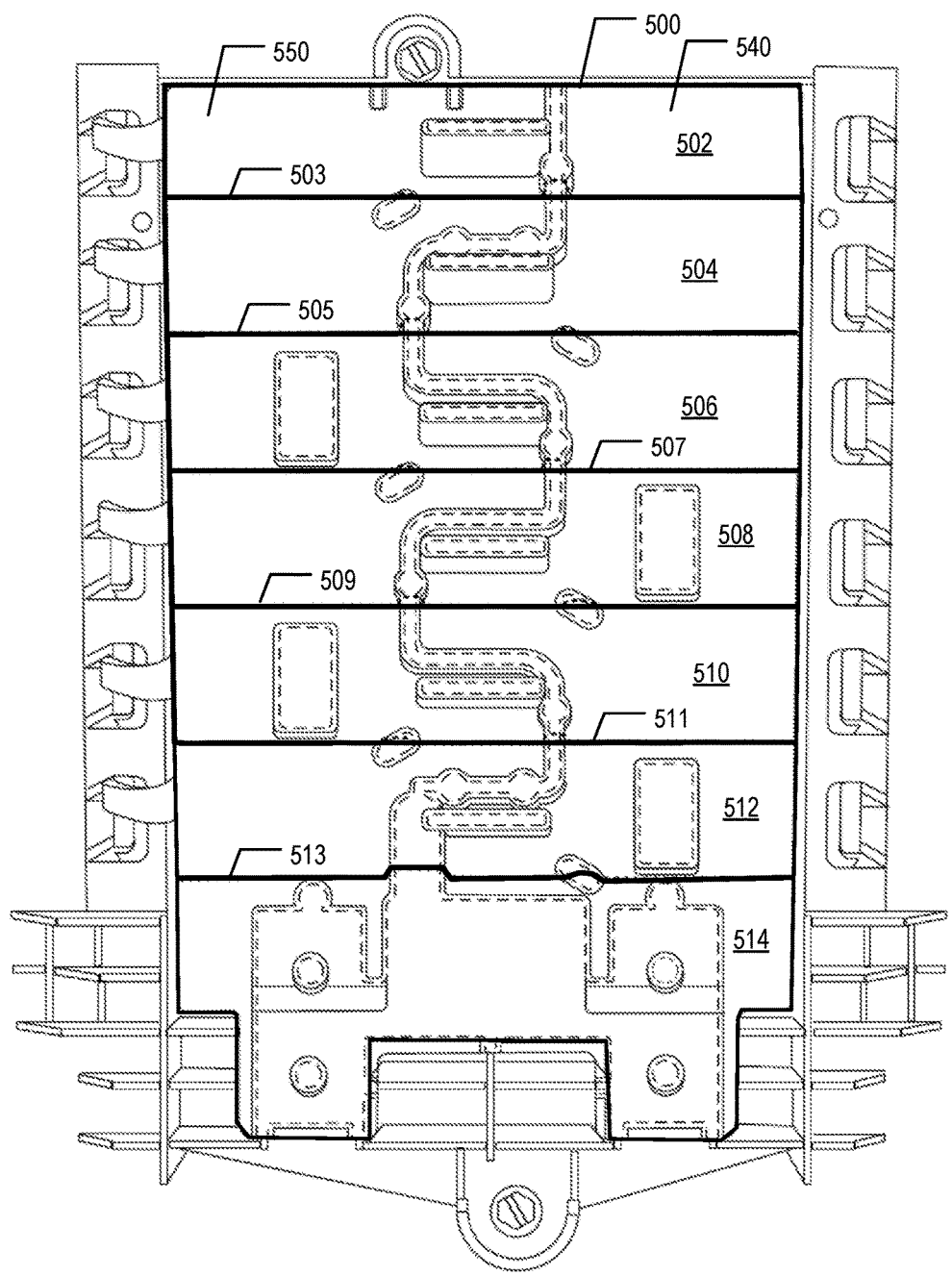
FIG. 10 is an alternate embodiment of an insulator apparatus.

FIG. 10 is an alternate embodiment of an insulator apparatus 500. In this implementation, that insulator modules 502, 504, 506, 508, 510 and 512 are not integrally formed, but instead abut each other at their respective interior peripheries 503, 505, 507, 509, 511 and 513. When in place, the insulator modules 502, 504, 506, 508, 510 and 512 completely cover the bus bars 540 and 550. The insulator modules 502, 504, 506, 508, 510 and 512 are molded in a form to be flexibly received and attached to the panel, and easily removed for installation of circuit breakers.

While the example breaker panels illustrated above include bus tabs, the insulator apparatus can be formed to fit other breaker panels that do not include bus tabs. As long as the insulator apparatus is formed to affix to the exterior contours and protrusions of a panel, it may provide the insulation benefits described above. Moreover, it need not even affix to the bus bar if the bus bars comprise planar surface regions that mate with breakers, so long as it affixes to other portions of the breaker panel so that it may remain affixed to the breaker panel. Thus, the insulator apparatus described above may be adapted to affix to any number of different types of breaker panels.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An insulator apparatus, comprising:
    a plurality of insulator modules formed of an insulator material, each insulator module:
        corresponding to a respective portion of a bus bar apparatus in a breaker panel;
        modularly formed to affix within the breaker panel to cover its respective portion of the bus bar apparatus and to provide insulation protection from the respective portion of the bus bar apparatus when affixed within the breaker panel; and
        defined by a periphery that corresponds to a periphery of one or more circuit breakers that can attach to the respective portion of the bus bar apparatus;
    separation regions defining the peripheries of the insulator modules, each separation region having a shear strength less than a shear strength of the portion of the insulator material within the peripheries of the insulator modules such that, when the insulator apparatus is affixed within the breaker panel, each insulator module may be individually separated from the insulator apparatus to expose the respective portion of the bus bar apparatus to which it corresponds so that the respective portion of the bus bar so exposed may receive one or more circuit breakers.

2. The insulator apparatus of claim 1, wherein the insulator module is modularly formed to affix to the breaker panel by being modularly formed to receive one or more conductive bus tabs of the respective portion of the bus bar apparatus and to provide insulation protection from the one or more conductive bus tabs of the respective portion of the bus bar apparatus when the conductive bus tabs are received by the insulator module.

3. The insulator apparatus of claim 1, wherein the separation regions are formed of the insulator material and integrally formed with the plurality of insulator modules.

4. The insulator apparatus of claim 2, wherein the separation regions are perforations.

5. The insulator apparatus of claim 2, wherein the separation regions have a thickness that is less than a thickness of the insulator material within the peripheries of the insulator modules.

6. The insulator apparatus of claim 1, wherein the insulator material is a flexible elastomer.

7. The insulator apparatus of claim 1, wherein the insulator material is one of neoprene rubber, ethylene propylene diene monomer (EPDM) rubber, or silicone rubber.

8. The insulator apparatus of claim 1, wherein the insulator material is a thermoplastic.

9. The insulator apparatus of claim 1, wherein each respective portion of the bus bar apparatus is a hot bus bar.

10. A circuit breaker panel, comprising:
    a breaker box; and
    a bus bar apparatus within the main breaker box, the bus bar apparatus including a pair of opposed hot bus bars, each of the hot bus bars including a plurality of respective portions that can electrically couple to a circuit breaker when the circuit breaker is received in the breaker box; and an insulator apparatus, comprising a plurality of insulator modules formed of an insulator material, each insulator module:
- corresponding to a respective portion of the opposed hot bus bars;
- modularly formed to affix within the breaker box and to cover its respective portion of the bus bar apparatus and to provide insulation protection from the respective portion of the bus bar apparatus when affixed within the breaker box; and
- defined by a periphery that corresponds to a periphery of one or more circuit breakers that can attach to the respective portion of the hot bus bars;

separation regions defining the peripheries of the insulator modules, each separation region having a shear strength less than a shear strength the portion of the insulator material within the peripheries of the insulator modules such that, when the insulator apparatus affixed within the breaker panel, each insulator module may be individually separated from the insulator apparatus to expose the respective portion of the hot bus bars to which it corresponds so that the respective portion of the hot bus bars so exposed my receive one or more circuit breakers.

11. The circuit breaker panel of claim 10, wherein the each insulator module is modularly formed to affix to the breaker box by being modularly formed to receive one or more conductive bus tabs of the respective portion of the bus bar apparatus and to provide insulation protection from the one or more conductive bus tabs of the respective portion of the bus bar apparatus when the conductive bus tabs are received by the insulator module.

12. The circuit breaker panel of claim 10, wherein the separation regions are formed of the insulator material and integrally formed with the plurality of insulator modules.

13. The circuit breaker panel of claim 10, wherein the separation regions are perforations.

14. The circuit breaker apparatus of claim 10, wherein the separation regions have a thickness that is less than a thickness of the insulator material within the peripheries of the insulator modules.

15. The circuit breaker apparatus of claim 9, wherein the insulator material is a flexible elastomer.

16. The circuit breaker apparatus of claim 9, wherein the insulator material is one of neoprene rubber, ethylene propylene diene monomer (EPDM) rubber, or silicone rubber.

17. An insulator system, comprising:
one or more insulator modules formed of an insulator material, each insulator module:
- corresponding to a respective portion of a bus bar apparatus in a breaker panel;
- modularly formed to affix within the breaker panel to cover its respective portion of the bus bar apparatus and to provide insulation protection from the respective portion of the bus bar apparatus when affixed within the breaker panel; and
- defined by a periphery that corresponds to a periphery of one or more circuit breakers that can attach to the respective portion of the bus bar apparatus.

* * * * *